United States Patent
Gacoin et al.

(10) Patent No.: US 10,010,994 B2
(45) Date of Patent: Jul. 3, 2018

(54) METHOD FOR TAPING AN OPTICAL LENS MEMBER

(71) Applicant: ESSILOR INTERNATIONAL (COMPAGNE GENERALE D'OPTIQUE), Charenton-le-Pont (FR)

(72) Inventors: Eric Gacoin, Charenton-le-Pont (FR); Luis Castro, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/651,608

(22) PCT Filed: Dec. 9, 2013

(86) PCT No.: PCT/EP2013/075915
§ 371 (c)(1),
(2) Date: Jun. 11, 2015

(87) PCT Pub. No.: WO2014/090723
PCT Pub. Date: Jun. 19, 2014

(65) Prior Publication Data
US 2015/0328741 A1   Nov. 19, 2015

(30) Foreign Application Priority Data
Dec. 11, 2012   (EP) .................................... 12306568

(51) Int. Cl.
*B24B 13/005*   (2006.01)
*B32B 37/18*   (2006.01)
(Continued)

(52) U.S. Cl.
CPC ........ *B24B 13/0055* (2013.01); *B24B 13/005* (2013.01); *B24B 47/225* (2013.01);
(Continued)

(58) Field of Classification Search
CPC . B24B 13/005; B24B 13/0055; B24B 47/225; B32B 37/12; B32B 37/18; Y10T 156/10; Y10T 156/1062
(Continued)

(56) References Cited

U.S. PATENT DOCUMENTS 4,242,162 A * 12/1980 Ronning ................ B24B 13/005
156/212
5,343,657 A * 9/1994 Ohlin, Jr. ............ B24B 13/0055
451/29
(Continued)

FOREIGN PATENT DOCUMENTS

EP   1080835   3/2001
EP   1762337   3/2007
(Continued)

*Primary Examiner* — Eileen Morgan
(74) *Attorney, Agent, or Firm* — Oblon, McClelland, Maier & Neustadt, L.L.P.

(57) ABSTRACT

Method of taping an optical lens member (10) to be manufactured. An optical lens member providing step (S1) is performed during which an optical lens member (10) is provided, the optical lens member has a first optical surface (11) associated with a first reference system and a second optical surface (12) to be manufactured, the first and second optical surfaces being connected by a external periphery surface (14), the first reference system being identified by at least one referencing element (111) on the first optical surface and/or the external periphery surface of the optical lens member, a taping step (S2) during which an adhesive tape (17) is provided on the first surface of the lens member so as to cover at least part of the first surface and leaving the referencing element uncovered.

13 Claims, 4 Drawing Sheets (51) Int. Cl.
*B32B 37/12* (2006.01)
*B24B 47/22* (2006.01)

(52) U.S. Cl.
CPC .............. *B32B 37/12* (2013.01); *B32B 37/18* (2013.01); *B32B 2307/412* (2013.01); *B32B 2551/00* (2013.01); *Y10T 156/10* (2015.01); *Y10T 156/1062* (2015.01)

(58) Field of Classification Search
USPC .................................. 451/5, 6, 10, 11, 42, 54
See application file for complete search history.

(56) References Cited

U.S. PATENT DOCUMENTS

| | | | | |
|---|---|---|---|---|
| 5,474,489 | A | * | 12/1995 | Vernon ................. B24B 13/005 451/390 |
| 5,520,568 | A | * | 5/1996 | Craighead ........... B24B 13/0057 24/584.1 |
| 6,036,013 | A | | 3/2000 | Chen |
| 6,149,750 | A | * | 11/2000 | Parish, Jr. ............ B24B 13/0057 156/154 |
| 2005/0042977 | A1 | * | 2/2005 | Kawase .................... B24B 9/14 451/41 |
| 2008/0149269 | A1 | * | 6/2008 | Suzuki ...................... B24B 9/14 156/312 |
| 2009/0301654 | A1 | * | 12/2009 | Suzuki ................... B24B 9/146 156/332 |

FOREIGN PATENT DOCUMENTS

| | | |
|---|---|---|
| EP | 2199021 | 6/2010 |
| WO | WO99/06225 | 2/1999 |

\* cited by examiner

METHOD FOR TAPING AN OPTICAL LENS MEMBER

RELATED APPLICATIONS

This is a U.S. national stage application under 35 USC § 371 of application No. PCT/EP2013/075915, filed on Dec. 9, 2013. This application claims the priority of European application no. 12306568.2 filed Dec. 11, 2012, the entire content of which is hereby incorporated by reference.

FIELD OF THE INVENTION

The invention relates to a method of taping an optical lens member to be manufactured, a method of blocking an optical lens member and a method of manufacturing an optical lens.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

An optical lens is typically made of plastic or glass material and generally has two opposed surfaces which co-operate with one another to provide a required corrective prescription. When the positioning of one of these surfaces with respect to the other or the shape of one of the faces is inaccurate, optical errors can be created.

Manufacturing of an optical lens to the required prescription requirements typically includes machining the surface of a semi-finished lens or lens blank. Typically, a semi-finished lens has a finished surface, for example the front surface and an unfinished surface, for example the back surface. By machining the back surface of the lens to remove material, the required shape and positioning of the back surface with respect to the front surface for the desired corrective prescription can be generated.

During manufacturing of the lens it is important that the semi-finished lens is securely maintained in an accurate position on a blocking system during the various manufacturing operations in order to prevent the generation of optical errors and to allow a good transmission of the efforts.

Conventionally, a semi-finished lens is provided with engraved markings on the finished surface. The engraved markings define a reference system of the design of the finished surface of the lens.

So as to manufacture accurately the unfinished surface of the semi-finished lens, the semi-finished lens is maintained by blocking the finished surface of the lens on a blocker. Various materials may be employed to secure the semi-finished lens to the blocker. These materials include glues, thermoplastic materials and low temperature fusible metal alloys.

The use of such materials requires that the finished surface of the lens be protected prior to being blocked on the blocker. A protective tape is generally placed on the finished surface prior to blocking the semi-finished lens.

The protective tape can make the viewing of the engraved markings difficult, for example through the semi-finished lens. Thus, it may be difficult to accurately determine the position in which the semi-finished lens is blocked. An inaccurate position of the semi-finished lens on the blocker may create optical errors in the final lens.

Furthermore, it may be difficult after having manufactured the unfinished surface to accurately determine the relative positions of both optical surfaces of the optical lens.

SUMMARY OF THE INVENTION

A goal of the present invention is to provide a method that allows manufacturing an optical lens with an increase accuracy of the positioning of both surfaces.

In accordance with a first aspect of the invention there is provided a method of taping an optical lens member. The method comprises:
  an optical lens member providing step during which an optical lens member is provided, the optical lens member comprising a first optical surface associated with a first reference system and a second optical surface to be manufactured, the first and second optical surfaces being connected by a external periphery surface, the first reference system being identified by at least one referencing element on the first optical surface and/or the external periphery surface of the optical lens member,
  a taping step during which an adhesive tape is provided on the first surface of the lens member so as to cover at least part of the first surface and leaving the referencing element uncovered.

Advantageously, having the adhesive tape provided so as to leave the referencing elements uncovered increases the accuracy of the determination of the positions of such referencing elements. Therefore, the operators while protecting the first surface of the optical lens member, may determine more easily and accurately the position of the referencing elements and thus the first reference system.

According to further embodiments which can be considered alone or in combination:
  during the taping step, the method further comprises a cutting step during which part of the adhesive tape after having been placed on the first optical surface of the optical lens member is cut off and removed so as to leave the referencing element uncovered; and/or
  during the taping step, the adhesive tape is provided as a pre-cut chip; and/or
  the first optical surface of the optical lens member is divided in a central zone and a peripheral zone, the referencing element identifying the first reference system being in the peripheral zone; and/or
  the peripheral zone has an annulus shape extending from the side of the first optical surface over a distance smaller than or equal to 10 mm; and/or
  the central zone corresponds to the final shape of the first optical surface the optical lens before being edged; and/or
  during the taping step, the adhesive tape is provided so as to cover only the central zone; and/or
  the referencing element comprises optical markings and/or at least one mechanical element; and/or
  the mechanical element corresponds to a single or a plurality a machined support zone, for example a chamfered zone formed at least on the external periphery surface of the optical lens member.

Another aspect of the invention relates to a method of blocking an optical lens member comprising:
  lens member providing and taping steps according to the invention,
  a blocker providing step during which a blocker with a blocker reference system is provided, a blocking step during which the optical lens member is blocked on the blocker in a blocking position, the blocking position being determined with respect to the blocker reference system using the first reference system.

Another aspect of the invention relates to a method of manufacturing an optical lens, the method comprising:
lens member providing, taping, blocker providing, and blocking steps according to the invention,
a surface data providing step during which surface data corresponding to the second surface of the optical lens to be manufactured are provided,
a manufacturing step during which the second surface of the optical lens member is manufactured according to the surface data and to the first reference identified by the referencing elements so that the relative position of the first and second surfaces is respected.

According to further embodiments which can be considered alone or in combination:
the method further comprising:
a comparing step during which a blocking positioning error between the first reference system and the blocker reference system is determined,
a configuration step during which operational parameters of a lens manufacturing tool are configured according to the surface data and the blocking positioning error such that the relative position of the first and second surfaces is respected, and
during the manufacturing step during the optical lens member is manufactured using the operational parameters of the lens manufacturing tool; and/or
the surface data further comprises the position of the second surface relative to the first surface of the optical lens to be manufactured, and the manufacturing step comprises:
a machining step during which the second surface of the optical lens is machined according to the surface data, and
a second referencing element providing step during which second referencing elements identifying a second reference system of the second surface are provided on the second surface of the optical lens; and/or
the manufacturing step further comprises prior to the second referencing element providing step a second referencing element determining step during which the second referencing elements are determined according at least to optical data representing the refractive properties of the optical lens and to observation data representing observation conditions in which the first and second referencing elements are to be observed.

Another aspect of the invention relates to a computer program product comprising one or more stored sequences of instructions that are accessible to a processor and which, when executed by the processor, causes the processor to carry out the steps of a method according to an embodiment of the invention.

BRIEF DESCRIPTION OF THE DRAWINGS

Non limiting embodiments of the invention will now be described with reference to the accompanying drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the sense of the invention, a "Design" is a widely used wording known from the man skilled in the art to designate the set of parameters allowing defining an optical function of a generic optical system; each ophthalmic lens manufacturer has its own designs, particularly for aspherical lens and for progressive lens. As for an example, a progressive lens "design" results of an optimization of the progressive surface so as to restore a presbyope's ability to see clearly at all distances but also to optimally respect all physiological vision functions such as foveal vision, extra-foveal vision, binocular vision and to minimize unwanted astigmatisms.

In the sense of the invention "manufacturing parameters" are the setting parameters of the different manufacturing devices involved in the manufacturing method. In the sense of the invention "method parameter" includes any measurable parameters on the manufacturing devices used for the manufacturing of the lens.

Figure 1:
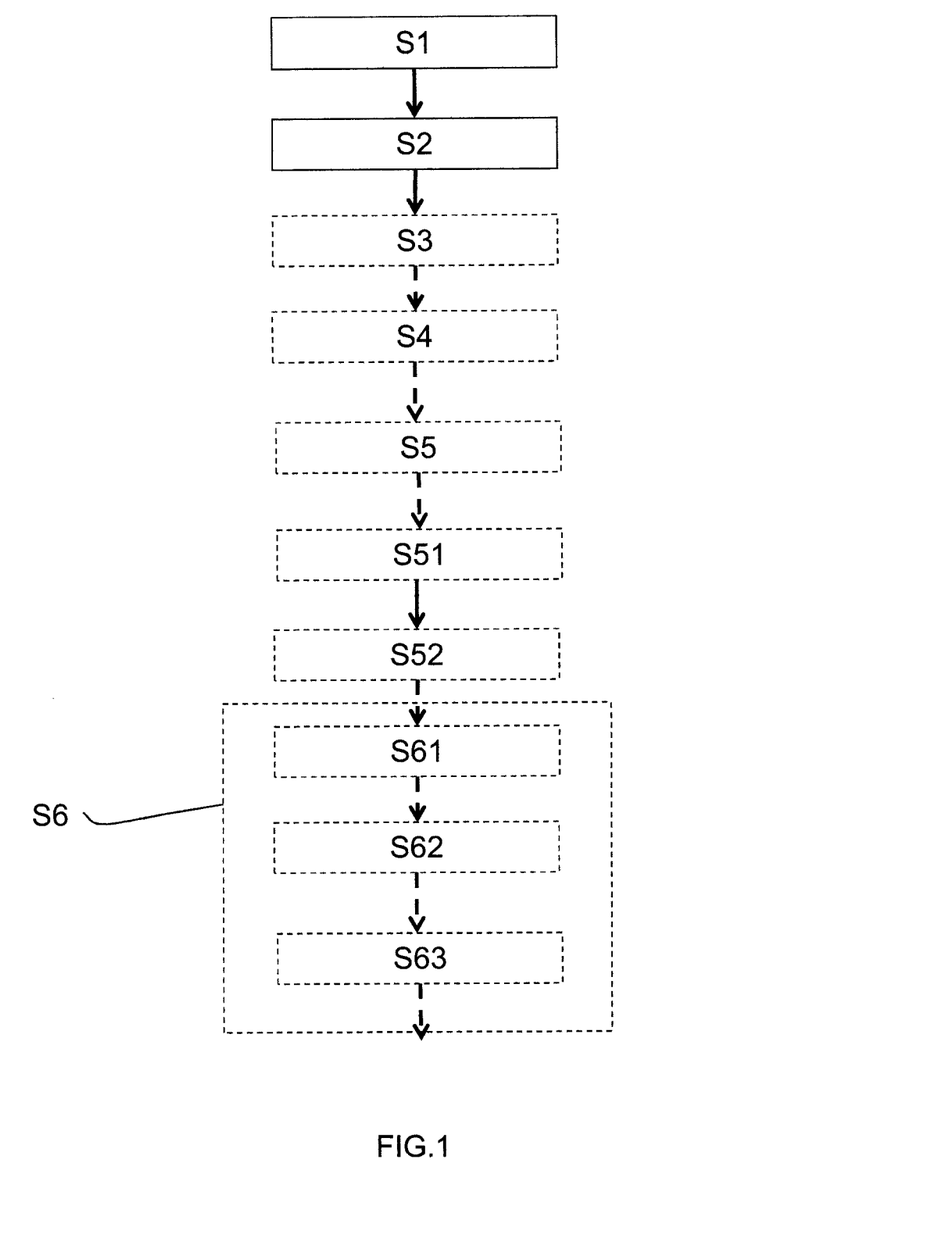
FIG. 1 is flowchart representing the steps of a method according to different embodiments of the invention.

According to an embodiment of the invention illustrated on FIG. 1, the method of taping an optical lens member to be manufactured comprises at least:
an optical lens member providing step S1, and
a taping step S2.

During the optical lens member providing step S1, an optical lens member to be manufactured is provided.

Figure 2:
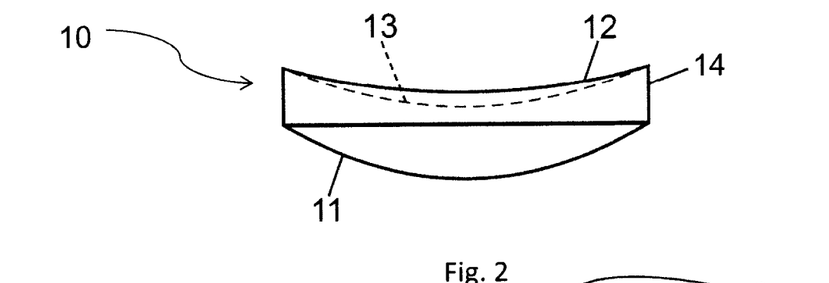
FIG. 2 is schematic side view of an optical lens member to be manufactured according to embodiments of the invention.

As represented on FIG. 2 the optical lens member 10 has a first optical surface with a first design, for example a preformed front surface 11. In use of the resulting finished optical lens, the preformed front surface 11 is disposed nearest the object being viewed. The optical lens member further comprises a second optical surface 12 to be modified by the manufacturing process to provide for example the back surface 13 of the finished optical lens, represented by the dotted line. The second optical surface 12 is machined by a machining tool so that the back surface 13 is orientated with respect to and distanced from the front surface 11, according to the required optical prescription. The first and second optical surfaces are connected by an external periphery surface 14.

While in this embodiment of the invention, the first surface is the front surface of the lens member and the second surface is the back surface, it will be understood, that in alternative embodiments of the invention the first surface may be the back surface of the semi-finished lens member and the second surface may be the front surface.

Furthermore, while in this embodiment of the invention, the back surface of the optical lens is formed by the machining process, it will be understood, that in alternative embodiments of the invention both or either surfaces of the lens may be formed by the machining process.

Moreover, although the surface 13 to be manufactured is represented in FIG. 2 as concave, it will be appreciated that this surface 13 could equally well be convex or any other curved surface.

Figure 3:
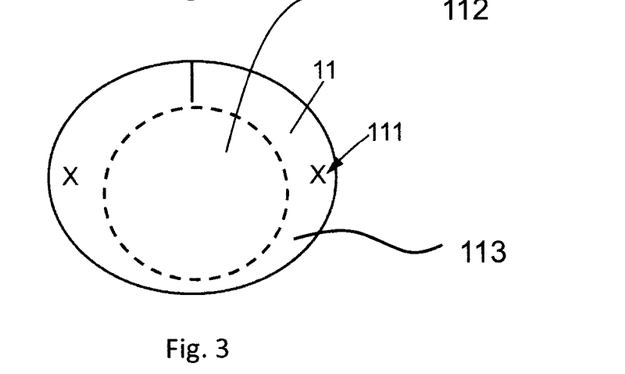
FIG. 3 is a planar top view of a preformed surface of an optical lens member to be machined according to embodiments of the invention.

With reference to FIG. 3, referencing elements 111 are provided on the first surface 11 of lens member 10 as reference features for defining a first reference system for positioning of the first design of the first surface 11.

As represented on FIG. 3, the first optical surface of the lens member may be divided in a central zone 112 and a peripheral zone 113. The referencing elements 111 are in the peripheral zone 113.

According to an embodiment of the invention, the peripheral zone 113 has an annulus shape extending from the side of the first optical surface 11 over a distance smaller than or equal to 10 mm, for example smaller than or equal to 5 mm. Advantageously, having the referencing elements 111 in such peripheral zone limits the risk of having such referencing elements disturbing the wearer of the resulting finished optical lens. Indeed, the peripheral zone is most likely to be edged when edging the finished optical lens so as to fit the spectacle frame selected by the wearer.

According to an embodiment of the invention, the central zone 112 may correspond to the final shape of the first optical surface of the optical surface after being machined and before being edged. Thus, the reference elements 111 do not risk disturbing the wearer since the peripheral zone 113 has been removed.

According to an embodiment of the invention, the referencing elements 111 may be optical markings, for example engraved marking having a depth of a few micrometers on the first optical surface of the lens member or comprises a mechanical element, for example a chamfered zone formed at least on the external periphery surface of the optical lens member 10.

In the sense of the invention optical markings are markings that may be detected by optical means.

According to an embodiment of the invention, the external periphery surface 14 connecting the first and second optical surfaces may be used as a first mechanical reference and a portion forming a ramp between the external periphery surface 14 and one of the optical surfaces may be used as a second mechanical reference. The portion forming a ramp may be a chamfered zone.

The mechanical markings may comprise a grooved zone, for example on the external periphery surface 14 or on the first optical surface.

The mechanical markings may comprise a plurality, for example three, of notches formed on the external periphery surface 14.

During the taping step S2, an adhesive tape is provided on the first optical surface of the lens member so as to cover at least part of the first optical surface and leave at least the referencing elements uncovered.

Examples of suitable adhesive tapes are given in U.S. Pat. No. 6,036,013.

According to an embodiment as illustrated on FIG. 3, the adhesive tape may be arranged so as to cover only the central zone. This situation is advantageous, because it allows reducing the use of tape only to lens member usable surface.

The adhesive tape may be provided in as pre-cut chips, for example round shaped or oval shape or elliptic shaped, and placed over the first optical surface of the lens member, for example over the central zone. The pre-cut chip has an average diameter smaller than the average diameter of the first optical surface of the optical lens member. The pre-cut chip can be placed manually or automatically, for example using a vacuum based device.

Advantageously, providing the adhesive tape as pre-cut chips makes the taping step easier to implement for the operator.

According to an embodiment of the invention, the taping step may comprise taping the entire first optical surface and a cutting step during which part of the adhesive tape is cut off and removed so as to leave the referencing elements uncovered.

The adhesive tape may be removed by using a cutting blade and/or a heating tip.

Figure 4:
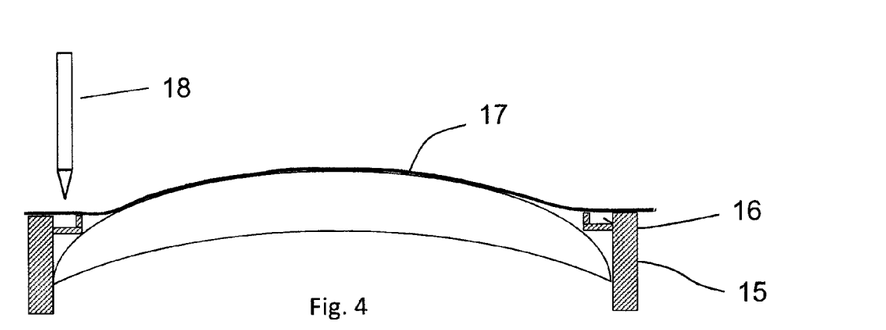
FIG. 4 is a schematic side representation of an example of device that may be used to implement a taping step according to an embodiment of the invention.

As represented on FIG. 4, a ring 15 having an inner groove 16 remote from the edge of the ring 15 of a few millimeters is provided around the optical lens member 10. An adhesive tape 17 may than be placing over the first optical surface 11 and cut for example by moving a hot tip 18 in the inner groove.

According to an aspect of the invention, the optical lens member after being taped is blocked.

As represented on FIG. 1, a blocking method according to the invention may comprise after the taping step: a blocker providing step S3 and a blocking step S4.

During the blocker providing step S3 a blocker with a blocker reference system is provided.

During the blocking step S4, the optical lens member is blocked on the blocker in a blocking position. The blocking position is determined with respect to the blocker reference system using the first reference system.

Figure 5:
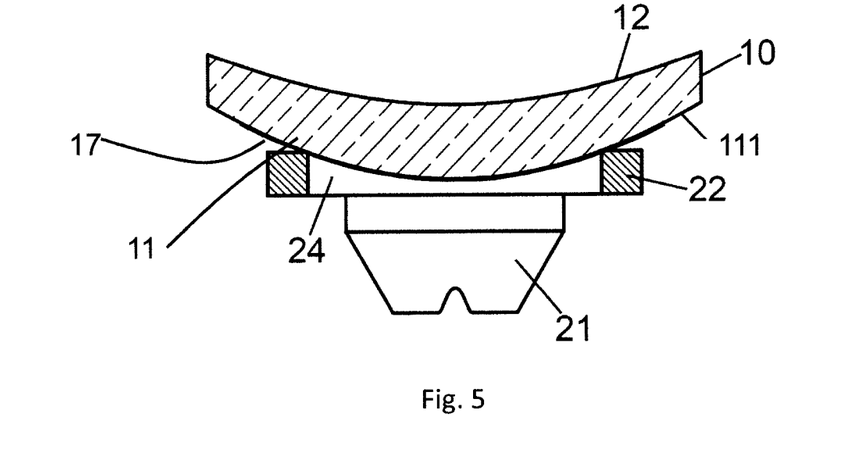
FIG. 5 is a schematic cross section representation of a lens member blocked on a blocking device.

Referring now to FIG. 5, a lens blocking device for blocking lens member 10 in the correct position for manufacturing processes comprises an insert 21 and a blocking ring 22. Blocking cast material 24 is poured into the cavity defined by the lower surface of the lens member 10, the insert 21 and the blocking ring 22. The blocking cast material 24 cools to solidify in order to provide a blocker for the lens member 10 at the desired positioning for machining.

Figure 6:
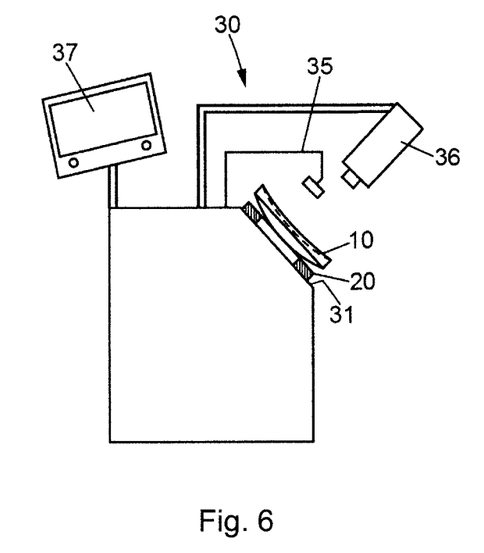
FIG. 6 is schematic view of a lens member on a blocking station according to an embodiment of the invention.

As illustrated in FIG. 6, a lens blocking device 20 is part of a blocking station 30. Blocking station 30 comprises the blocking device 20 disposed on a top plate 31 of the blocking station 30 and a clamping arm 35 which may be moved from a free position to a clamping position in which it holds the lens member 10 in place on the blocking device 20. Blocking station 30 also includes a digital camera 36 for taking an image of the positioning of the lens member 10 on the blocking device 20, and a screen 37 for viewing the image from the digital camera 36. The lens member 10 may also be directly viewed by an operator without using the digital camera 36.

Figure 7:
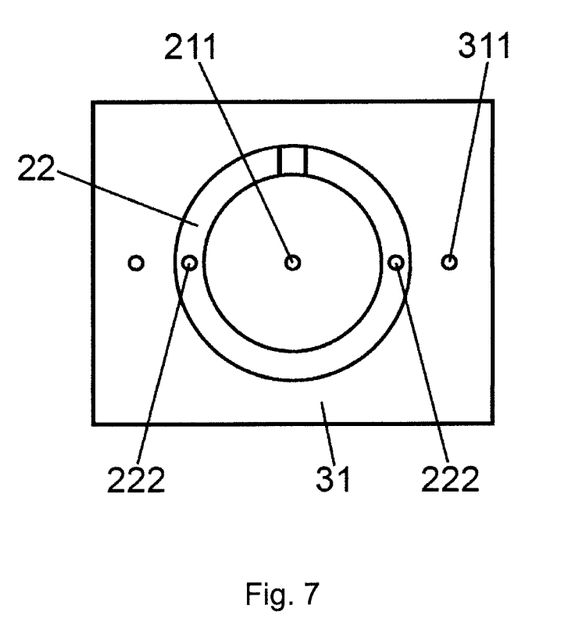
FIG. 7 is a planar top view of the contact surface of the blocking device and blocking plate of the blocking station of FIG. 6.

As illustrated on FIG. 7, the blocking device 20 is provided with blocker reference markings including alignment markings 222 provided on the blocking ring 22 and a central marking 211. In the case where an insert is provided in the center of the blocking ring, the central marking 211 is provided on the insert. The top plate 31 of the blocking station 30 is devoted to receive a blocking ring 22 on the top plate 31. Alignment markings 222 on the ring may include a hole for receiving corresponding positioning projections on the top plate 31 allowing the ring 22 to be correctly positioned on the blocking plate 31. The alignment markings 222 may be further provided with a line marking following a reference axis to aid alignment.

After the lens member 10 has been placed on the blocking device 20, the operator may make an initial judgment as to the quality of the positioning by direct visualization of the reference markings 111 of lens member 10 with respect to the reference markings of the blocking device 20 before continuing the blocking process. If the operator is not satisfied with the initial positioning, the lens member 10 may be repositioned manually or automatically on the blocking device 20. Once the operator is satisfied with the positioning the clamping arm 35 may be put in place to hold the lens member 10 in position on the blocking device 20.

The positioning of lens member 10 on the blocking device 20 can then be quantified using the digital camera 36. In order to measure the positioning of the lens member 10, the referencing elements 111 provided on the lens member and the reference markings 211 and 222 provided on the blocking device 20 are viewed through the lens member 10 by means of the camera 36 of the blocking device 20 as illustrated in FIG. 6. Deviation of the image of the referencing element 111 located on the front surface 11 of the lens member 10 due to refractive properties of the lens member 10 is taken into account when making measurements of the position of the first reference system relative to the reference markings on the blocking ring 22

The peripheral zone 113 presents the advantage to keep visible the markings through the lens member even when the lens member is blocked on the blocking device. The peripheral zone 113 also lets free external side parts of the lens member which cooperate with mechanical reference parts of a blocking ring and help for positioning the lens member. Presence of any film in the peripheral zone 113 would generate uncontrolled optical prism in the finished optical lens.

A method according to the invention may further comprise after having blocked the optical lens member, manufacturing the second optical surface of the optical lens member. As illustrated on FIG. 1, the method may further comprise a surface data providing step S5, and a manufacturing step S6.

During the surface data providing step S5, surface data corresponding to the second optical surface 13 of the optical lens to be manufactured is provided.

During the manufacturing step S6, the second surface of the optical lens member is manufactured according to the surface data and to the first reference identified by the referencing elements so that the relative position of the first and second surfaces is respected.

So as to increase the accuracy of the manufacturing method and the quality of the manufactured optical lens, the method may comprise prior to the manufacturing step S6: a comparing step S51 and a configuration step S52.

During the comparing step S51, the blocking position error is determined. The blocking position error corresponds to the difference in position between the first reference system and the blocker reference system.

During the configuration step S52, operational parameters of a lens manufacturing tool are configured according to the surface data and the blocking positioning error such that the relative position of the first and second surfaces is respected.

So as to provide an easy control method of the relative positions of the first and second optical surfaces, the manufacturing step S6 of a method according to the invention may comprise a second markings determining step S61, machining step S62, and a second marking step S63.

During the second markings determining step S61, second markings identifying the second reference system of the second surface are determined. The second markings may be determined according at least to optical data representing the refractive properties of the optical lens and to observation data representing observation conditions in which the first and second markings are to be observed.

The optical data represent at least the prescription of the wearer for which the optical lens is manufactured.

For example, the second markings may be determined so as to appear at the same position as the referencing elements 111 in the observation conditions when the second surface is correctly positioned relatively to the first surface. Advantageously, the operator may check very easily the relative position of the first and second reference systems.

The second markings may be determined so as to take into account a positioning error tolerance.

The second optical surface of the optical lens member is machined during the machining step S62 according to the surface data.

The second markings determined during the second marking determining step S61 are provided on the machined second optical surface during the second markings providing step S63.

So as to increase the overall accuracy of the method, during the second markings providing step, the optical lens is blocked in the same position as during the machining step.

The invention has been described above with the aid of embodiments without limitation of the general inventive concept. In particular, although in the described embodiments the referencing elements are identified using a camera, it will be understood, that any determining device allowing determining the positions of the reference elements can be used.

The invention claimed is:

1. A method of taping an optical lens member to be manufactured comprising:

providing an optical lens member, the optical lens member comprising a first optical surface associated with a first reference system and a second optical surface to be manufactured, the first and second optical surfaces being connected by an external periphery surface, the first reference system being identified by at least one referencing element on the first optical surface and/or the external periphery surface of the optical lens member; and providing an adhesive tape on the first optical surface of the lens member so as to cover at least part of the first optical surface and leaving the at least one referencing element uncovered, wherein during the providing of the adhesive tape, a part of the adhesive tape, after having been placed on the first optical surface of the optical lens member, is cut off and removed so as to leave the referencing element uncovered.

2. The method according to claim 1, wherein the first optical surface of the optical lens member is divided in a central zone and a peripheral zone, the referencing element identifying the first reference system being in the peripheral zone.

3. The method according to claim 2, wherein the peripheral zone has an annulus shape extending from the side of the first optical surface over a distance smaller than or equal to 10 mm.

4. The method according to claim 2, wherein the central zone corresponds to a final shape of the first optical surface of the optical lens member before being edged.

5. The method according to claim 2, wherein during the providing of the adhesive tape, the adhesive tape is provided so as to cover only the central zone.

6. A method of blocking an optical lens member comprising:
the providing of the optical lens member and the providing of the adhesive tape according to claim 1;
providing a blocker with a blocker reference system; and
blocking the optical lens member on the blocker in a blocking position, the blocking position being determined with respect to the blocker reference system using the first reference system.

7. A method of manufacturing an optical lens comprising:
providing the optical lens member, providing the adhesive tape, providing the blocker, and blocking according to claim 6;
providing surface data corresponding to the second surface of the optical lens to be manufactured; and
manufacturing the second surface of the optical lens member according to the surface data and to the first reference identified by the referencing elements so that the relative position of the first and second surfaces is respected.

8. The method of manufacturing an optical lens according to claim 7, further comprising:
determining a blocking positioning error between the first reference system and the blocker reference system;
configuring operational parameters of a lens manufacturing tool according to the surface data and the blocking positioning error such that the relative position of the first and second surfaces is respected; and
during the manufacturing, the optical lens member is manufactured using the operational parameters of the lens manufacturing tool.

9. The method of manufacturing an optical lens according to claim 7,
wherein the surface data further comprises a position of the second surface relative to the first surface of the optical lens to be manufactured,
wherein the manufacturing comprises:
machining the second surface of the optical lens member according to the surface data; and
providing a second referencing element identifying a second reference system of the second surface on the second surface of the optical lens.

10. The method according to claim 9, wherein the at least one referencing element comprises optical markings and/or at least one mechanical element.

11. The method according to claim 10, wherein the at least one mechanical element corresponds to a chamfered zone formed at least on the external periphery surface of the optical lens member.

12. The method of manufacturing an optical lens according to claim 11, wherein the manufacturing further comprises, prior to the providing of the second referencing element, determining the second referencing element according at least to optical data representing refractive properties of the optical lens and to observation data representing observation conditions in which the first and second referencing elements are to be observed.

13. A method of manufacturing an optical lens comprising:
providing an optical lens member, the optical lens member comprising a first optical surface associated with a first reference system and a second optical surface to be manufactured, the first and second optical surfaces being connected by an external periphery surface, the first reference system being identified by at least one referencing element on the first optical surface and/or the external periphery surface of the optical lens member;
providing an adhesive tape on the first optical surface of the lens member so as to cover at least part of the first optical surface and leaving the at least one referencing element uncovered,
providing a blocker with a blocker reference system;
blocking the optical lens member on the blocker;
providing surface data corresponding to the second optical surface of the optical lens to be manufactured; and
manufacturing the second optical surface of the optical lens member according to the surface data and to the first reference identified by the referencing elements,
wherein during the providing of the adhesive tape, part of the adhesive tape, after having been placed on the first optical surface of the optical lens member, is cut off and removed so as to leave the referencing element uncovered.

* * * * *